Aug. 16, 1949.  L. R. LUDWIG ET AL  2,479,380
FLUID PRESSURE OPERATED CIRCUIT INTERRUPTER
Filed April 21, 1945  6 Sheets-Sheet 1

WITNESSES:
E. G. McCloskey
W. R. Crout

INVENTORS
Leon R. Ludwig, Howard M. Wilcox
and Raymond H. Leitzel.
BY Ralph H. Swingle
ATTORNEY Aug. 16, 1949.     L. R. LUDWIG ET AL     2,479,380
FLUID PRESSURE OPERATED CIRCUIT INTERRUPTER
Filed April 21, 1945     6 Sheets-Sheet 2
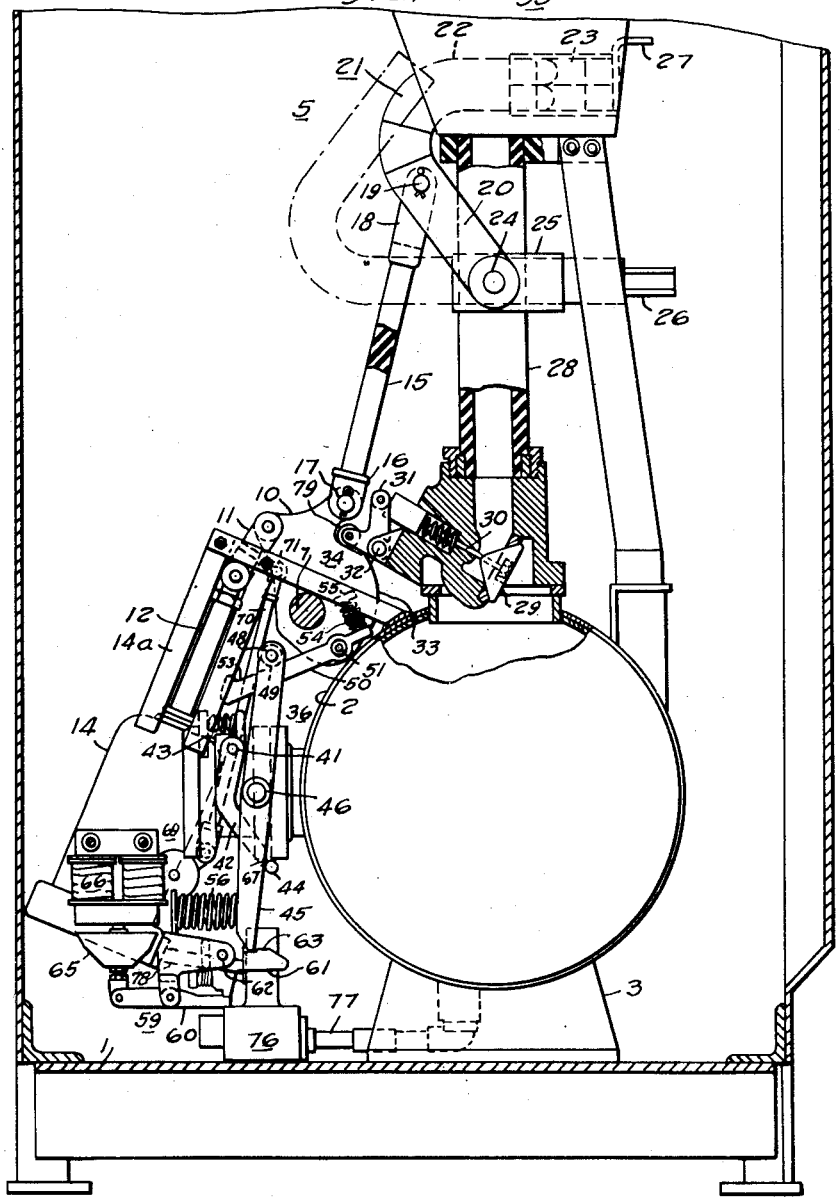
WITNESSES:
INVENTORS
Leon R. Ludwig, Howard M. Wilcox
and Raymond H. Leitzel.
BY
ATTORNEY

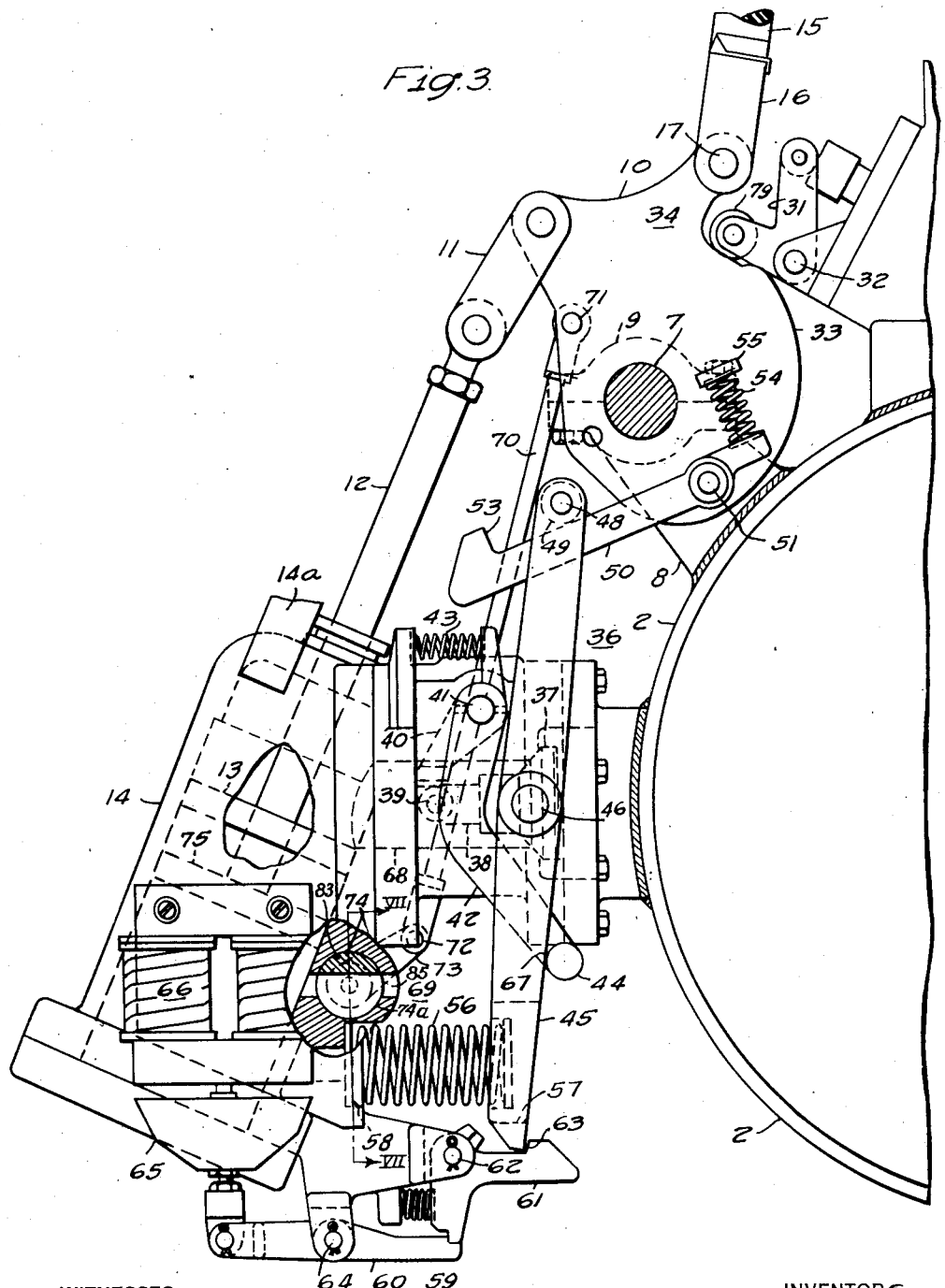

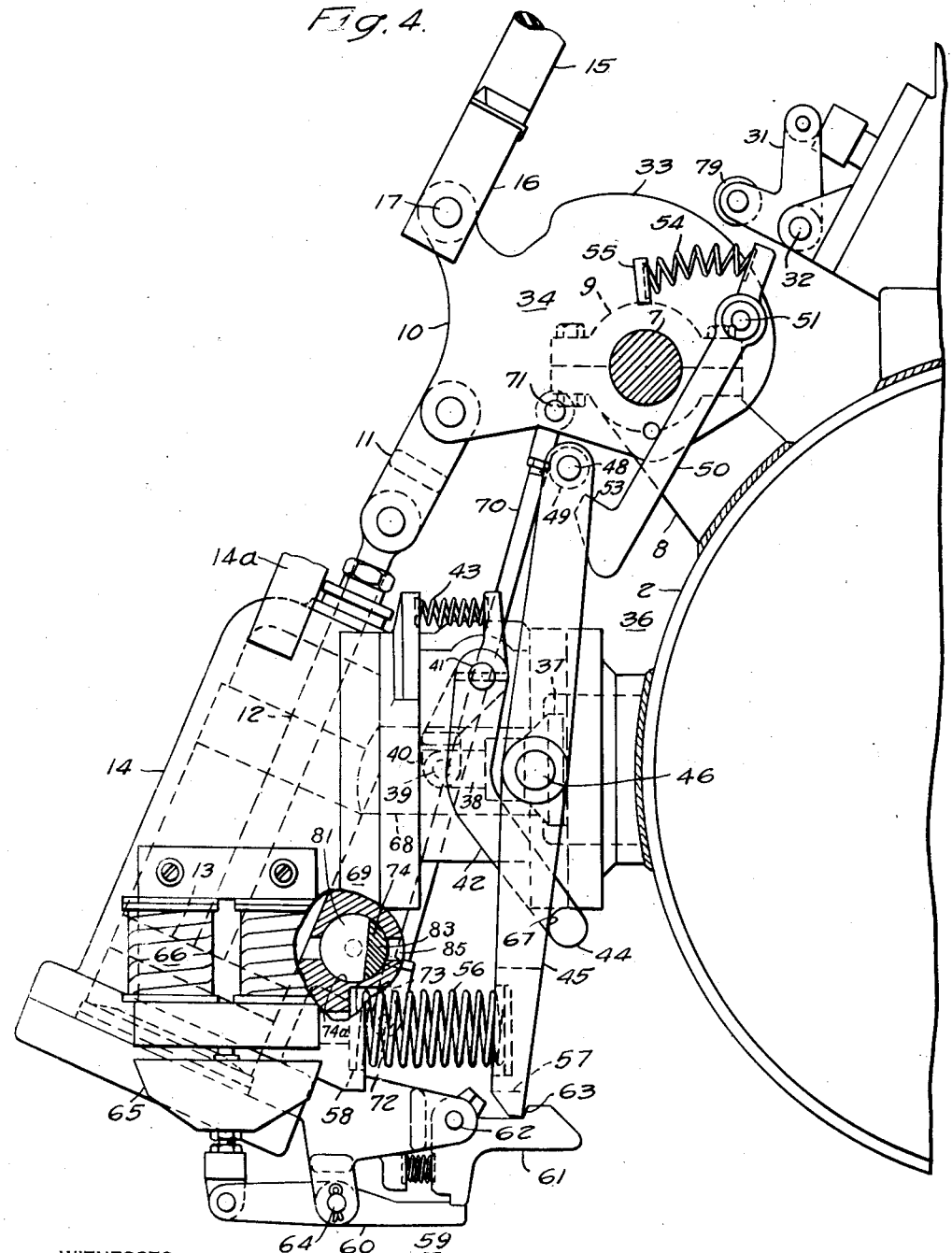

Aug. 16, 1949.     L. R. LUDWIG ET AL     2,479,380
FLUID PRESSURE OPERATED CIRCUIT INTERRUPTER
Filed April 21, 1945     6 Sheets-Sheet 5
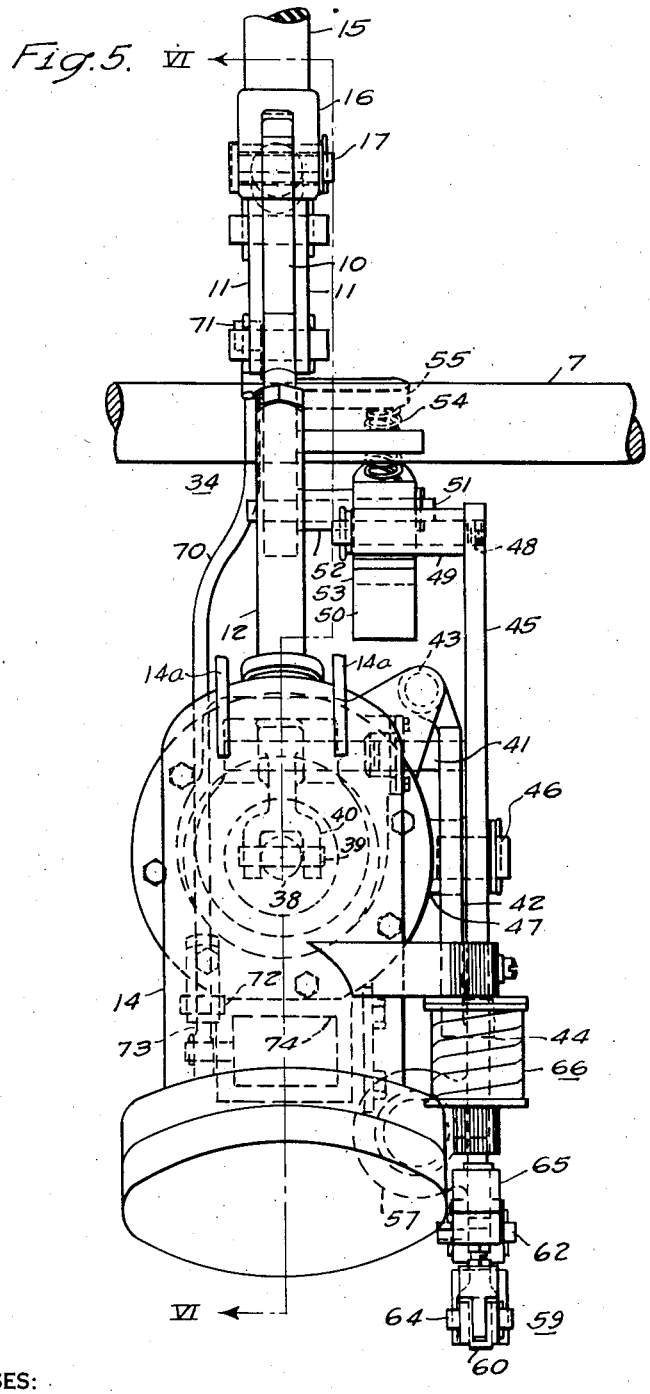
WITNESSES:
E.A. M'Closkey
W. R. Crout
INVENTORS
Leon R. Ludwig, Howard M. Wilcox
and Raymond H. Leitzel.
BY
Ralph H. Swingle
ATTORNEY Aug. 16, 1949.　　L. R. LUDWIG ET AL　　2,479,380
FLUID PRESSURE OPERATED CIRCUIT INTERRUPTER
Filed April 21, 1945　　6 Sheets-Sheet 6
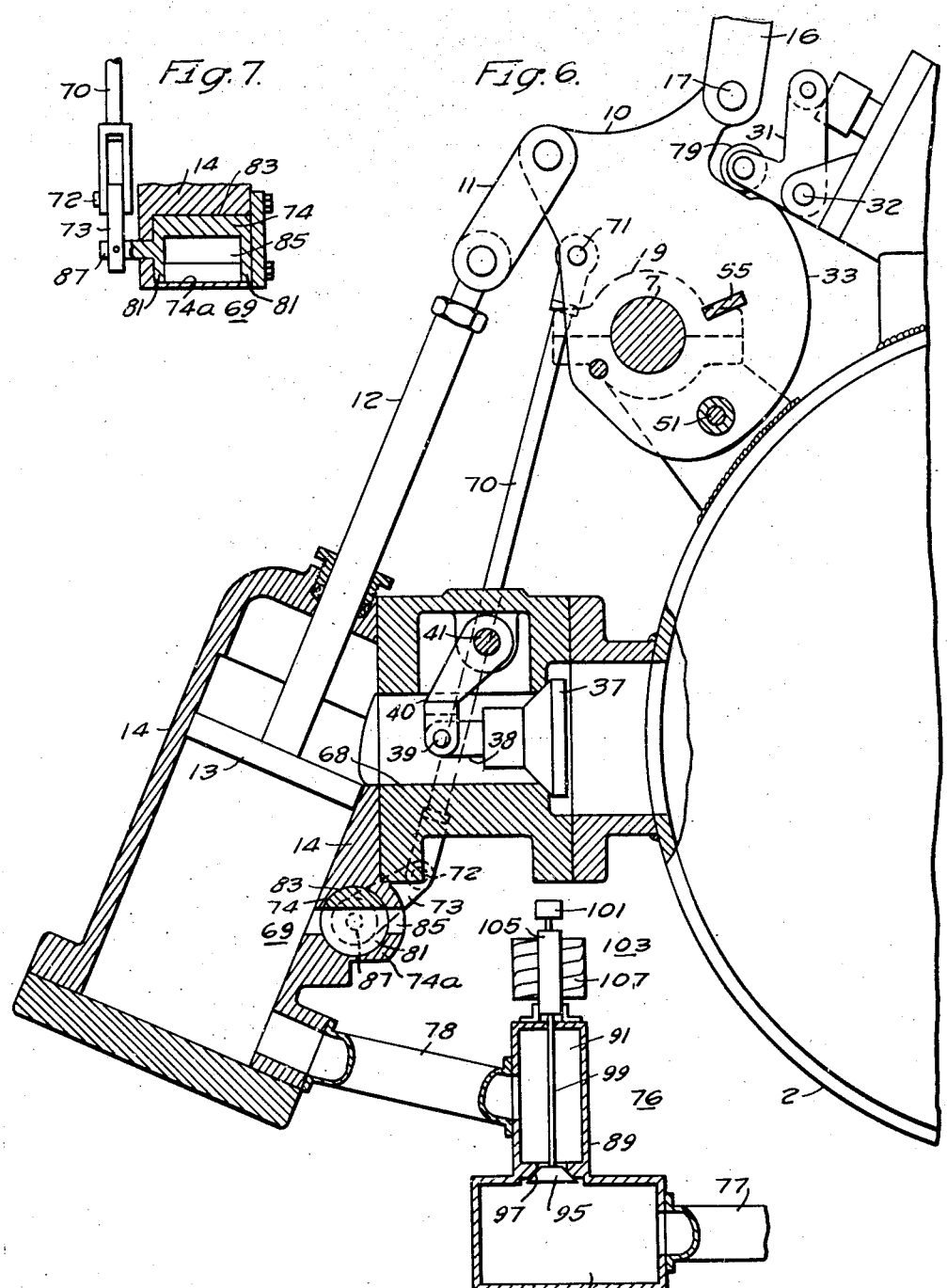
WITNESSES:
INVENTORS
Leon R. Ludwig, Howard M. Wilcox
and Raymond H. Leitzel.
BY
ATTORNEY Patented Aug. 16, 1949

2,479,380

UNITED STATES PATENT OFFICE 2,479,380

FLUID PRESSURE OPERATED CIRCUIT INTERRUPTER

Leon R. Ludwig and Howard M. Wilcox, Wilkinsburg, and Raymond H. Leitzel, Forest Hills, Pa., assignors to Westinghouse Electric Corporation, East Pittsburgh, Pa., a corporation of Pennsylvania Application April 21, 1945, Serial No. 589,582

15 Claims. (Cl. 200—82)

This invention relates to circuit interrupters in general and more particularly to operating mechanisms for circuit interrupters of the gas blast type.

The contacts of a conventional compressed air circuit interrupter are normally operated by applying an electrical impulse to a solenoid, opening a small pilot valve and admitting air to the piston of a larger relay valve which on opening admits air to the contact operating cylinder in sufficient volume to open or close the contacts. This chain of successive operations in series is initiated by manual operation of a control switch or by action of a protective relay and meets the requirements of normal switching service where circuit interruption in 0.130 second is regarded as satisfactory.

However, certain applications require very much faster isolation of an electrical fault for adequate protection of life, property and adjacent circuits as, for instance, in single phase A. C. railway service where 0.040 second is regarded as the maximum time permissible for circuit interruption. Under these conditions, the series of successive operations, dictated by the fact that the heavy electrical current required to open a large valve directly against reservoir pressure is undesirable, consumes more time than is desirable.

It is an object of our invention to remedy the foregoing difficulties and to provide an improved compressed gas circuit interrupter which is of high speed operation.

A more specific object is to provide a circuit interrupter of the gas blast type in which biasing means are provided to bias the valve controlling the flow of air from the reservoir to the operating cylinder to the open position, and to provide retaining means for holding the valve closed.

Another object is to provide an improved gas blast circuit interrupter in which biasing means are employed to operate the valve controlling the flow of compressed gas to the operating cylinder, and to provide improved means for recharging the biasing means.

Another object is to provide an improved exhaust valve for an operating cylinder of a compressed gas circuit interrupter which will permit high speed reopening and which will provide a cushion of air in the operating cylinder near the end of the opening operation to absorb the kinetic energy of the moving parts of the interrupter.

Further objects and advantages will readily become apparent upon a reading of the following specification taken in conjunction with the drawings, in which:

Fig. 2 is a side elevational view partially in section of the circuit interrupter shown in Fig. 1, the section being taken substantially on the line II—II of Fig. 1, the contacts also being shown in the closed circuit position;

Fig. 3 is a fragmentary enlarged side elevational view partially in section of the operating mechanism shown in Fig. 2, the contacts also being shown in the closed circuit position;

Fig. 4 is a view similar to Fig. 3 but showing the position of the several parts in the fully open circuit position of the interrupter;

Fig. 5 is a fragmentary enlarged front elevational view of the improved operating mechanism of our invention;

Fig. 6 is a vertical sectional view through the operating cylinder, taken substantially on line VI—VI of Fig. 5 and looking in the direction of the arrows; and Fig. 7 is a vertical sectional view through the exhaust valve taken on line VII—VII of Fig. 3 and looking in the direction of the arrows.

Figure 1:
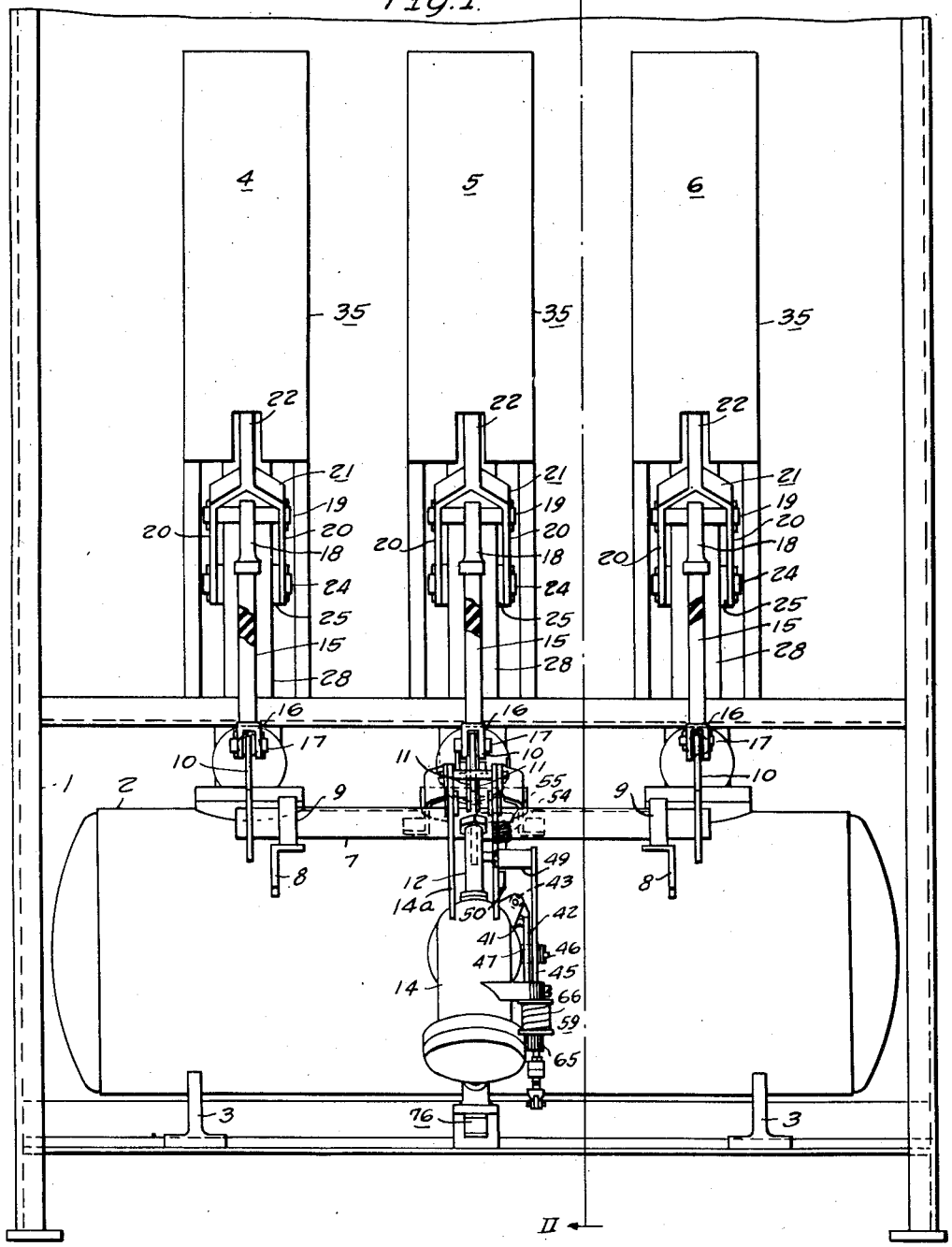
Figure 1 is a front elevational view of a three pole circuit interrupter embodying our invention and shown in the closed circuit position.

Referring to the drawings and more particularly to Fig. 1 thereof, the reference numeral 1 designates a suitable framework composed of channels or similar angle iron construction which supports a tank or source 2 of compressed gas, the latter resting on supports 3. Extending upwardly and supported by the tank 2 are the three poles of the interrupter designated by the reference numerals 4, 5 and 6. Preferably, the poles are of identical construction, and the contact structures thereof are simultaneously operated by the rotation of an operating shaft 7. The shaft 7 is supported longitudinally of the tank 2 by brackets 8 which are preferably welded to the tank 2, and bearings 9, the latter being of the semicircular type, as shown more fully in Figs. 3 and 4.

Referring to Figs. 2 and 3 it will be noted that the operating shaft 7 has a crank portion 10 which is coupled by two links 11 to the piston rod 12, the lower end of which has a piston 13 operatively secured thereto which is reciprocally movable within an operating cylinder 14. Supporting guides 14a are employed to position the cylinder 14 and to guide the motion of the piston rod 12 therein. An insulating operating rod 15 has its lower end secured to a metallic yoke-shaped member 16 which straddles the crank portion 10 being pivotally secured thereto by a pin 17. The upper end of the insulating operating rod 15 is secured to a metallic extension 18 having an aperture provided therethrough, through which passes a pin 19. The pin 19 also extends through the legs 20 of a conducting bifurcated member 21, the upper unitary portion of which forms the movable contact 22. The movable contact 22 cooperates with a stationary contact 23. The bifurcated member 21 has the lower extremities of the legs 20 pivotally supported at 24 to a bracket 25 formed of conducting material, the right-hand end of which forms a line terminal at 26. The second line terminal 27 of the interrupter is electrically connected to the stationary contact 23.

Consequently, it will be apparent from the foregoing description that in the closed circuit position of the interrupter, as shown in Figs. 1 and 2, the electrical circuit through each pole of the interrupter includes the line terminal 27, stationary contact 23, movable contact 22, bifurcated member 21, bracket 25 to line terminal 26. Separation of the movable contact 22 from the stationary contact 23 is effected by rotation of the bifurcated member 21, the rotation being caused by counterclockwise rotation of the shaft 7 and crank portion 10.

Upon the drawing of the arc established upon the separation of the movable contact 22 from the stationary contact 23, a blast of gas is permitted to pass upwardly through the blast tube 28, the blast of gas being controlled by a blast valve 29, as shown more clearly in Fig. 2. The blast valve 29 has a stem 30 spring biased toward the closed position and opened by clockwise rotation of a bell crank 31, the latter being pivotally mounted at 32. The bell crank 31 is rotated about the pivot 32 by a cam portion 33 of the crank portion 10.

Thus, during the opening operation, the piston 13 is forced downwardly by gas pressure to the lower end of the operating cylinder 14 and effects by this motion counterclockwise rotation of the rotatable operating means 34 of the interrupter which includes the crank portion 10 and cam portion 33. The rotation of the rotatable operating means 34 effects separation of the contact structure through the operating rod 15 and also effects simultaneously clockwise rotation of the bell crank 31 to effect opening of the blast valve 29. The blast of gas permitted to pass upwardly through the blast tube 28 by opening of the blast valve 29 extinguishes the arc which was established by the separation of the movable contact 22 from the stationary contact 23.

The arc chute 35 which cooperates with the upwardly passing gas blast to effect extinction of the arc forms no part of our invention and is preferably of the type set forth in U. S. Patent No. 2,272,380 which issued February 10, 1942, to Leon R. Ludwig, Herbert L. Rawlins and Benjamin P. Baker, and which was assigned to the assignee of the instant application.

Conduit means 36 are utilized to transmit a flow of compressed gas from the source of gas pressure 2 to the upper end of the operating cylinder 14, this flow being controlled by a valve 37 positioned essentially within the head of the cylinder which is extended to form the conduit. The valve 37 is more clearly shown in Figs. 3, 4 and 6 and is of the poppet type which gives a large area of opening with only a small movement, thus admitting the air quickly and speeding up the opening of the circuit breaker. The valve 37 has a stem 38 which is pivotally coupled at 39 to a yoke-shaped member 40, the upper end of which is pivotally mounted by a press fit on a shaft 41. Referring to Fig. 5, it will be noted that secured to the right-hand end of the shaft 41 is an operating arm 42 biased at its upper end by a compression spring 43 in a clockwise direction to move the valve to closed position and bias it against its seat. The lower end of the operating arm 42 has a laterally extending portion 44 which makes contacting engagement in the position of the parts as shown in Fig. 3 with a lever 45, the latter being pivotally mounted at 46 to a laterally extending portion 47 of the conduit means 36. The upper end of the lever 45 has a pin 48 threadedly secured thereto about which is positioned a sleeve 49.

A lever 50 pivotally mounted at 51 to an extension 52 of the crank portion 10 has a hook portion 53 and is biased in a clockwise direction about the pin 51 by a compression spring 54. The upper end of the compression spring 54 seats against a lug 55 formed integrally with the crank portion 10.

The lever 45 is strongly biased in a counterclockwise direction about its stationary pivot 46 by a strong compression spring 56. The righthand end of the compression spring 56, as viewed in Fig. 3, seats against a laterally extending portion 57 of the lever 45. The left-hand end of the compression spring 56 seats against a portion 58 of the operating cylinder casing. The lever 45 is latched in position by latching means 59 comprising a trigger 60 and a latch 61 of the slip off type, the latter being pivotally mounted at 62. The latch 61 has a nose 63 which serves to latch the lower end of the lever 45. The trigger 60 is rotated about its pivotal mounting 64 by upward movement of an armature 65 associated with a solenoid 66.

Thus, upon energization of the winding of the solenoid 66, there results upward movement of the armature 65 to thereby cause clockwise rotative movement of the trigger 60 to effect release of the lever 45, the latter being strongly biased in a counterclockwise direction about the pivot 46 by the strong compression spring 56. Consequently, upon release of the latching means 59, the compression spring 56 forces the lever 45 to rotate in a counterclockwise direction about the pivot 46. The counterclockwise rotative movement of the lever 45 causes the portion 67 of the lever 45 to engage the laterally extending portion 44 of the operating arm 42 to thereby effect opening motion of the valve 37.

The opening of the valve 37 permits a direct passage of compressed gas from the source of gas pressure 2 through the conduit means 36 and into the upper end of the operating cylinder 14 through the passage 68. The passage of gas from the tank 2 into the upper end of the operating cylinder 14 causes rapid downward movement of the piston 13. This effects blast valve opening and contact separation in the manner previously set forth.

It will be observed that the continued counterclockwise rotation of the crank portion 10 causes the hook portion 53 of lever 50 to pick up the sleeve 49 secured to the upper end of the lever 45 to thereby rotate the lever 45 in a clockwise direction about the pivot 46 near the end of the opening stroke to thereby recharge the compression spring 56 and to permit relatching of the latching means 59.

From the above, it will be apparent that at the end of the opening stroke the lever 45 is relatched and the compression spring 56 is recharged, the parts assuming a position as shown in Fig. 4, compression spring 43 and the air pressure causing closure of valve 37.

An exhaust valve, indicated generally at 69, is provided to vent the closing air pressure from the cylinder 14 below the piston so that, in the event the circuit breaker is closed in against a fault, the closing charge of compressed air will not interfere with an immediate opening operation. The exhaust valve 69 comprises a rotatable valve member 74 mounted in a cylinder 74a formed in an integral portion of the cylinder 14. The exhaust valve member 74 comprises a pair of spaced discs 81 (Fig. 7) rigidly joined by an integral member 83 which, upon rotation of the valve member, is adapted to close an exhaust port 85 communicating the cylinder 14 to atmosphere. One of the discs 81 is provided with a short shaft 87 which extends through an opening in one end of the cylinder 74a and has an arm 73 attached thereto. A rod 70 has one end pivotally connected to the free end of the arm 73 by means of a pivot pin 72 and the other end of the rod 70 is pivotally connected by means of a pivot pin 71 to the rotatable operator 10.

As previously set forth, the operator 10 is rotated counterclockwise during an opening operation. This movement, acting through the rod 70, arm 73 and shaft 87 rotates the exhaust valve member 34 in a clockwise direction from the position in which it appears in Fig. 3. Just before the operating piston 13 passes the exhaust port, at approximately the position indicated by dotted lines 75, the valve member 83 closes off the exhaust port 85 which traps a portion of the air in the cylinder below the piston to cushion the opening movement of the breaker mechanism. At the end of the opening stroke of the piston 13, the exhaust valve member 74 assumes the position indicated in Fig. 4. Some of the opening charge of compressed air leaks to atmosphere around the piston rod 12 and the remaining air is slightly compressed during the closing stroke in the relatively large volume of the cylinder 14 above the piston 13 and in the inlet passage 68 to cushion the closing movement of the breaker mechanism.

To effect the closing operation of the interrupter an electropneumatically actuated valve 76 (Fig. 2) is energized, to thereby permit compressed gas to flow from the tank 2 through conduit 77 and through the conduit 78 to the lower end of the operating cylinder 14 below the piston 13 which is now at the lower end of its stroke. It will be noted that at the beginning of the closing operation the lever 45 has been previously relatched, the energization of the solenoid 66 only being momentarily. Thus, at the beginning of the closing stroke, the parts assume a position, as shown in Fig. 4.

The valve 76 comprises a housing 89 divided into an upper chamber 91 and a lower chamber 93. The chamber 91 communicates with the cylinder 14 below the piston 13 by means of the conduit 78 and the lower chamber 93 communicates by means of the conduit 77 with the tank 2. A passage communicating the chambers 91 and 93 is normally closed by means of a valve member 95 seated against a valve seat 97 formed in the housing 89. A valve stem 99 secured to the valve member 95 extends upwardly through an air tight opening in the housing 89 and has its upper end secured to the moving armature 101 of an electromagnet 103. In addition to the armature 101, the electromagnet 103 comprises an E-shaped core member 105 mounted on the housing 89 and an energizing winding 107. The armature 101 is biased to unattracted position by means of a spring (not shown) which also normally biases the valve 95 to the closed position.

Energization of the electromagnet 103 operates the armature 101 to open the valve 95 and admit a charge of compressed air to the cylinder below the piston 13 to effect closing of the circuit breaker.

During the major portion of the closing stroke of the piston 13, the exhaust valve 69 remains closed. Near the end of the closing stroke, the exhaust valve 69 is opened to decrease the pressure below the piston 13. This has two advantages, namely: (1) the decrease in gas pressure below the piston 13 permits conditions to arise which are suitable for rapid reopening, (2) the decrease in gas pressure below the piston 13 caused by opening of the exhaust valve 69 near the end of the closing stroke decreases the force acting upwardly on the piston 13, thus minimizing the stress conditions imposed on the mechanism as the main breaker contacts engage.

It will be observed that during the closing operation the crank portion 10 and the rotatable operating means 34 rotate in a clockwise direction with the shaft 7, thereby simultaneously effecting contact closure through the medium of the operating rod 15, and opening of the blast valve 29 by engagement of the roller 79 of the bell crank 31 with cam portion 33 of the crank portion 10. This effects clockwise rotation of the bell crank 31 about its stationary center of rotation 32 to effect consequent opening of the blast valve 29.

The provision of the exhaust valve 69 located in an intermediate portion of the main operating cylinder 14 is thus arranged to provide an open vent as the piston 13 approaches the end of the closing stroke in order to dissipate air pressure below the piston in the event of an immediate opening operation being required, as well as to lessen pressure at the final closing point to avoid excessive closing impact of the movable contact 22 against the stationary contact 23. This vent associated with the exhaust valve 69 is inoperative as the piston passes it on the opening movement, thereby conserving air in the lower portion of the operating cylinder 14 to cushion the opening movement of the interrupter and thereby prevent excessive rebound.

It will be observed that the valve 37 which has biasing means 56 associated therewith is used to control the admission of opening air to the cylinder to effect opening operation of the interrupter. It is apparent that a similar valve could be employed in conjunction with a similar biasing means 56 to effect closing motion of the interrupter. Merely for purposes of illustration have we shown the valve 37 utilized in conjunction with opening air for the operating cylinder 14.

By means of the arrangement disclosed, a single electrical impulse results in admission of air directly to the operating cylinder 14 in sufficient volume to perform the opening contact movement. When used in conjunction with a high speed protective relay, the disclosed breaker will detect and isolate an electrical fault in 0.040 second or less.

It will also be observed that the invention discloses a spring operated valve which admits air from the breaker reservoir directly to the operating cylinder in sufficient volume to produce positive fast opening of the contacts. The valve 37 is operated by a lever spring biased to the open valve position but latched in the closed position. It will furthermore be noted that the power developed by air pressure on the operating piston 13 is utilized to reset the valve operating lever 45, thus recharging the biasing means comprising the compression spring 56, through action of the breaker operating crank 10 in opening the contacts.

From the foregoing description, it will be apparent that we have provided an improved gas blast circuit interrupter of an improved high speed construction in which one or more poles of the interrupter may be simultaneously operated to effect high speed motion of the movable contacts. It will be apparent that we have provided biasing means for biasing the valve which controls the operating air to the open position and have in addition provided latching means for restraining the biasing means. It will also be noted that the power generated by the opening movement utilizing the air pressure is employed to effect recharging of the biasing means and for effecting relatching of the latching means.

By utilization of the exhaust valve arrangement disclosed, rapid reopening operations may be obtained, and the movable parts of the interrupter are brought to a cushioned stop near the end of the opening stroke.

Although we have shown and described a specific structure, it is to be clearly understood that the same was merely for the purpose of illustration and that changes and modifications may readily be made therein by those skilled in the art without departing from the spirit and scope of the appended claims.

We claim as our invention:

1. In a circuit interrupter, an operating cylinder, a piston operable within the operating cylinder, means interconnecting the piston and the interrupter, a source of gas under pressure, a valve controlling the admission of gas from the source directly to the operating cylinder, a lever, means pivotally mounting the lever intermediate its ends, biasing means cooperating with one end of said lever for biasing the lever toward rotative movement to actuate said valve to open position, means interconnecting the lever and the valve means responsive to overload currents to effect operation of said lever to open said valve, and means for engaging the other end of said lever to recharge said biasing means.

2. In a circuit interrupter, an operating cylinder, a piston operable within the operating cylinder, means interconnecting the piston and the interrupter, a source of gas under pressure, a valve controlling the admission of gas from the source to the operating cylinder, means biasing said valve to closed position, a lever, means pivotally mounting the lever intermediate its ends, biasing means engaging one end of said lever for biasing the lever toward rotative movement, latch means releasably restraining said lever, means interconnecting the lever and the valve, electroresponsive means operable in response to overload currents to release said lever to thus effect opening of said valve and opening movement of said piston, and means operative in response to opening movement of the piston for engaging the other end of said lever to recharge the biasing means.

3. In a circuit interrupter, operating means for said interrupter comprising an operating cylinder, a piston operable within the operating cylinder, means interconnecting the piston and the interrupter, a source of gas under pressure, a valve controlling the admission of compressed gas from the source to one end of the operating cylinder to effect opening movement of said piston, a lever, means pivotally mounting the lever intermediate its ends, biasing means engaging one end of said lever for biasing the lever toward rotative movement, means interconnecting the lever and the valve, latching means for restraining motion of the lever, trip means operable in response to overload currents to release said lever means engageable with the other end of said lever and operative in response to opening movement of the piston for positively moving said lever to recharge the biasing means, and valve means operable to admit compressed gas to the other end of said cylinder to effect closing movement of said piston.

4. In a circuit interrupter, piston means for effecting operation of said interrupter, valve means for controlling the flow of gas to one side of the piston to effect opening movement of said piston means, means biasing the valve means to the open position, latching means for restraining motion of the biasing means, a trip device operable in response to overload currents to release said biasing means to permit said biasing means to open said valve, means operative in response to opening movement of the piston for recharging the biasing means, valve means operable to admit gas to the other side of said piston to effect closing movement of said piston, and an exhaust valve at all times movable with said piston and operable to the open position only during the closing movement of said piston to exhaust said closing gas to atmosphere.

5. In a circuit interrupter, an operating cylinder, a piston movable within the operating cylinder, means interconnecting the piston and the interrupter, an exhaust valve positioned intermediate the ends of the operating cylinder, and means operated by said interconnecting means for effecting opening of the exhaust valve only when the piston is near the closing end of the operating cylinder.

6. In a circuit interrupter, an operating cylinder, a piston operable within the operating cylinder, rotatable operating means operable by said piston to open and close said interrupter, means coupling the piston and the rotatable operating means, means coupling the interrupter and the rotatable operating means, a source of gas under pressure, a valve for controlling the flow of gas from the source to one end of the operating cylinder to effect opening movement of said piston, biasing means for biasing the valve to the open position, latching means for the biasing means, a trip device operable in response to overload currents to release said biasing means, means movable with the rotatable operating means for recharging the biasing means, valve means operable to admit gas to the other end of said cylinder to effect closing movement of said piston, a rotatable exhaust valve disposed between the ends of said cylinder, and means coupling the exhaust valve to the rotatable operating means for movement therewith at all times, said exhaust valve being movable to open position only near the end of the closing stroke of the operating means.

7. In a circuit interrupter, operating means therefor comprising a cylinder and a piston movable therein to effect opening and closing of said interrupter, a valve device for admitting compressed gas to one end of said cylinder to effect opening of said interrupter comprising an inlet valve, normally restrained biasing means for actuating said valve to open position, trip means operable to release said biasing means to effect opening of said inlet valve, a second inlet valve for admitting compressed gas to the other end of said cylinder to close said contact means, an exhaust valve disposed intermediate the ends of said cylinder, and means operable in accordance with the operation of said operating mechanism for opening said exhaust valve only near the end of the closing stroke of said piston.

8. In a circuit interrupter, operating means comprising a cylinder and a piston operable therein to effect opening and closing of said interrupter, an inlet valve for admitting compressed gas to one end of said cylinder to effect opening movement of said piston, a spring loaded actuator for said valve, means releasably restraining said actuator, said restraining means being operable to release said actuator to thereby effect high-speed opening of said inlet valve to admit an opening charge of compressed gas to said cylinder, valve means operable to admit compressed gas to the other end of said cylinder to effect closing movement of said piston, an exhaust valve disposed in said cylinder between the open and closed positions of said piston, and means operable by said operating means to effect opening of said exhaust valve only when the piston is near the end of the closing stroke.

9. An operating mechanism for a circuit breaker comprising a cylinder and a piston movable therein to a first and a second extreme position to open and close said circuit breaker, means including a first inlet valve operable to admit fluid pressure to said cylinder for moving said piston to said first extreme position to effect opening of said circuit breaker a second inlet valve operable to admit fluid pressure to said cylinder for moving said piston to said second extreme position to effect closing of said breaker, an exhaust valve in said cylinder between said extreme positions of said piston, and means actuated by said operating mechanism for opening said exhaust valve only when said piston nears said second extreme position.

10. An operating mechanism comprising a piston and a cylinder within which said piston is movable to a first and a second extreme position, independently operable inlet valves for admitting compressed gas to opposite ends of said cylinder to effect movement of said piston to said first and said second extreme positions, an exhaust valve disposed in said cylinder at a point intermediate said extreme positions of said piston, and rotatable means interconnecting said exhaust valve and said piston to open said exhaust valve only when said piston is moved to one of said extreme positions.

11. An operating mechanism comprising a piston and a cylinder within which said piston is movable between two extreme positions, a spring operated valve for admitting fluid pressure to one end of said cylinder to effect movement of said piston to one extreme position, an electromagnetically operated valve for admitting fluid pressure to the other end of said cylinder to effect movement of said piston to a second extreme position, an exhaust passage in said cylinder between said extreme position of said piston, a rotary valve element associated with said passage, and means actuated by said operating mechanism for operating said rotary valve element to open said exhaust passage only when said piston nears a particular one of its extreme positions.

12. A circuit interrupter including operating means comprising a fluid motor operable to open said interrupter, an inlet valve operable to admit compressed fluid to said motor to effect opening of said interrupter, operating means for said inlet valve including a releasable member, biasing means for operating said releasable member to open said inlet valve, holding means restraining said releasable member against movement by said biasing means, electroresponsive means operable to cause said holding means to release said releasable member, and resetting means operable by said fluid motor during an opening operation to recharge said biasing means and reset said releasable member at least by the time said interrupter reaches full open position.

13. A circuit interrupter including operating means comprising a fluid motor operable to open and close said interrupter, a first inlet valve operable to admit compressed fluid to said motor to effect closing of said interrupter, a second inlet valve operable to admit compressed fluid to said motor to effect opening of said contact means, operating means for said second inlet valve including a releasable member, means biasing said releasable member to open said second inlet valve, electroresponsive means operable to release said releasable member to effect opening of said second inlet valve, and resetting means operable by said motor during an opening operation to recharge said biasing means and to reset said releasable member at least by the time said interrupter reaches full open position.

14. A circuit interrupter having operating means comprising a fluid motor operable to open and close said interrupter, a first inlet valve operable to admit compressed fluid to said motor to effect closing of said interrupter, a second inlet valve operable to admit compressed fluid to said motor to effect opening of said interrupter, operating means for said second inlet valve including a releasable member, means biasing said releasable member to open said second inlet valve, electroresponsive means operable to release said releasable member to effect opening of said second inlet valve, said electroresponsive means being at times operable during a closing operation to effect opening of said second inlet valve and admission of compressed fluid to said motor to cause quick reversal of said motor and movement of said interrupter to open position irrespective of the condition of said first inlet valve, and resetting means operable by said motor during an opening operation to recharge said biasing means and reset said releasable member at least by the time said interrupter reaches full open position.

15. A circuit interrupter including operating means comprising a fluid motor operable to open said interrupter, an inlet valve of the poppet type operable to admit compressed fluid to said motor to effect opening of said interrupter, biasing means acting on said poppet valve in closing direction when the valve is closed, operating means for said inlet valve including a releasable member, a second biasing means for operating said releasable member to open said inlet valve, holding means restraining said releasable member against movement by said second biasing means, electroresponsive means operable to cause said holding means to release said releasable member, and resetting means operable by said fluid motor during an opening operation to recharge said second biasing means and reset said releasable member at least by the time said interrupter reaches full open position.

LEON R. LUDWIG.
HOWARD M. WILCOX.
RAYMOND H. LEITZEL.

REFERENCES CITED

The following references are of record in the file of this patent:

UNITED STATES PATENTS

| Number | Name | Date |
|---|---|---|
| 400,245 | Neu | Mar. 26, 1889 |
| 1,158,717 | Raber | Nov. 2, 1915 |
| 1,378,625 | Seator | May 17, 1921 |
| 2,282,228 | Johnson et al. | May 5, 1942 |
| 2,360,687 | Johnson | Oct. 17, 1944 |
| 2,401,008 | Ludwig et al. | May 28, 1946 |
| 2,408,199 | Cumming et al. | Sept. 24, 1946 |